US008096647B2

(12) United States Patent
Jones

(10) Patent No.: US 8,096,647 B2
(45) Date of Patent: Jan. 17, 2012

(54) SOLID INK STICKS HAVING A VERIFICATION INTERLOCK FOR VERIFYING POSITION OF A SOLID INK STICK BEFORE IDENTIFYING THE INK STICK

(75) Inventor: Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 372 days.

(21) Appl. No.: 12/234,827

(22) Filed: Sep. 22, 2008

(65) Prior Publication Data

US 2010/0073447 A1 Mar. 25, 2010

(51) Int. Cl.
*B41J 2/175* (2006.01)
*G01D 11/00* (2006.01)

(52) U.S. Cl. ........................................... 347/88; 347/99

(58) Field of Classification Search .................... 347/88, 347/99, 84, 85, 95, 19

See application file for complete search history.

(56) References Cited

U.S. PATENT DOCUMENTS

| | | | |
|---|---|---|---|
| 5,223,860 A * | 6/1993 | Loofbourow et al. | 347/88 |
| 5,510,821 A | 4/1996 | Jones et al. | |
| 6,719,419 B2 | 4/2004 | Jones et al. | |
| 6,755,517 B2 | 6/2004 | Jones et al. | |
| 6,761,443 B2 | 7/2004 | Jones | |
| 6,761,444 B2 | 7/2004 | Jones et al. | |
| 6,857,732 B2 | 2/2005 | Jones et al. | |
| 6,874,880 B2 | 4/2005 | Jones | |
| 6,893,121 B2 | 5/2005 | Jones | |
| 7,063,412 B2 | 6/2006 | Jones et al. | |
| 7,137,691 B2 | 11/2006 | Jones et al. | |
| 2003/0202056 A1 | 10/2003 | Jones et al. | |
| 2006/0279615 A1* | 12/2006 | Korn | 347/88 |
| 2007/0296781 A1 | 12/2007 | Jones et al. | |
| 2007/0296782 A1 | 12/2007 | Jones et al. | |
| 2007/0296783 A1 | 12/2007 | Jones | |
| 2008/0012916 A1 | 1/2008 | Jones | |
| 2008/0117264 A1 | 5/2008 | Fairchild et al. | |
| 2008/0218572 A1 | 9/2008 | Fairchild et al. | |
| 2008/0218573 A1 | 9/2008 | Fairchild | |

OTHER PUBLICATIONS

Wikipedia Entry on Pin Tumbler Lock—http://en.wikipedia.org/wiki/Pin_tumbler_lock.*

Liang, Leonard S.; Non-Final Office Action for U.S. Appl. No. 12/234,853; Mailed Dec. 21, 2010 (16 pages).

Lockman, David; Amendment in Response to Non-Final Office Action for U.S. Appl. No. 12/234,853; Submitted Mar. 21, 2011 (17 pages).

Liang, Leonard S.; Final Office Action for U.S. Appl. No. 12/234,853; Mailed Jun. 8, 2011 (16 pages).

Lockman, David; Amendment Accompanying Request for Continued Examination for U.S. Appl. No. 12/234,853; Submitted Aug. 8, 2011 (16 pages).

* cited by examiner

*Primary Examiner* — Stephen D Meier
*Assistant Examiner* — Leonard S Liang
(74) *Attorney, Agent, or Firm* — Maginot, Moore & Beck, LLP

(57) ABSTRACT

A solid ink stick facilitates verification of the position and orientation of a solid ink stick prior to an ink stick identification operation. The solid ink stick includes a solid ink stick body configured for insertion in a solid ink stick printer in a predetermined orientation, and a verification interlock in at least one surface of the solid ink stick body, the verification interlock and the at least one surface being located in the solid ink stick body to engage at least two displaceable members arranged in an insertion area of the solid ink printer to push one displaceable member away from the solid ink stick body and to enable the other displaceable member to move towards the solid ink stick body when the solid ink stick body is in the predetermined orientation in the insertion area.

18 Claims, 5 Drawing Sheets

SOLID INK STICKS HAVING A VERIFICATION INTERLOCK FOR VERIFYING POSITION OF A SOLID INK STICK BEFORE IDENTIFYING THE INK STICK

TECHNICAL FIELD

The verification system and method described below relate to object identification systems, and more particularly, to ink jet printers that identify solid ink sticks.

BACKGROUND

Solid ink or phase change ink imaging devices, hereafter called solid ink printers, encompass various imaging devices, such as printers and multi-function devices. These printers offer many advantages over other types of image generating devices, such as laser and aqueous inkjet imaging devices. Solid ink or phase change ink printers conventionally receive ink in a solid form, either as pellets or as ink sticks. A color printer typically uses four colors of ink (yellow, cyan, magenta, and black). The solid ink pellets or ink sticks, hereafter referred to as ink, sticks, or ink sticks, are delivered to a melting device, which is typically coupled to an ink loader, for conversion of the solid ink to a liquid. A typical ink loader includes multiple feed channels, one for each color of ink used in the imaging device. Each feed channel directs the solid ink within the channel towards a melting device located at the end of the channel. Each melting device receives solid ink from the feed channel to which the melting device is connected and heats the solid ink impinging on it to convert the solid ink into liquid ink that is delivered to a print head for jetting onto a recording medium or intermediate transfer surface.

Each feed channel may have a corresponding insertion opening to receive solid ink sticks. Alternatively, a solid ink jet printer may have a common insertion port in which solid ink sticks are loaded and then delivered to the channel that corresponds to the loaded ink stick. In both types of loading systems, the ink stick may be identified by detecting encoded indicia on the stick and comparing the detected data to data stored in the printer. The stored data identifies the ink sticks that are configured for use in the printer and the color of the ink sticks. Only if the detected data corresponds to the stored data is an ink stick accepted by the printer or released from the insertion opening or port to a feed channel in the printer.

In printers having an insertion opening for each feed channel, keyed openings may be placed over the insertion ports to help ensure a printer user properly places and orients ink sticks of the correct color or series in a feed channel. To accomplish this goal, each keyed opening has a unique shape. The ink sticks of the color corresponding to a particular feed channel have a shape corresponding to the shape of the keyed opening. The keyed openings and corresponding ink stick shapes exclude from each ink feed channel ink sticks of all colors except the ink sticks of the proper color for the feed channel. Unique keying shapes for other factors are also employed in keyed openings to exclude from a feed channel ink sticks that are formulated or intended for other printer models.

As the number of pages printed per minute increases for solid ink printers so does the demand for ink in the printer. To supply larger amounts of ink to printers, the cross-sectional area of the feed channels may be increased. Consequently, the insertion openings for the channels and the keyed plates covering the openings are likewise enlarged. These larger openings enable smaller solid ink sticks to pass through without engaging the keyed plates over the openings. Thus, solid ink sticks that do not conform to the appropriate color for a feed channel can be loaded into the feed channel and delivered to the melting device at the end of the feed channel. Even if the smaller stick is the correct color for the feed channel, its size may impair the ability of the stick to cooperate with guiding structure within the feed channel. Likewise, as common insertion ports increase in size, ink stick not configured for use in the printer may be inserted in the port. As long as these sticks have an identification code that corresponds to a code stored in the memory of an identification code detector, these sticks may be used in the printer. Thus, ensuring insertion ports in a solid ink printer are loaded only with ink sticks configured for transport within the feed channel is a desirable goal.

SUMMARY

A solid ink stick facilitates verification of the position and orientation of a solid ink stick prior to an ink stick identification operation. The solid ink stick includes a solid ink stick body configured for insertion in a solid ink stick printer in a predetermined orientation, and a verification interlock in at least one surface of the solid ink stick body, the verification interlock and the at least one surface being located in the solid ink stick body to engage at least two displaceable members arranged in an insertion area of the solid ink printer to push one displaceable member away from the solid ink stick body and to enable the other displaceable member to move towards the solid ink stick body when the solid ink stick body is in the predetermined orientation in the insertion area.

A set of solid ink sticks facilitates verification of the position and orientation for a plurality of solid ink sticks of different colors. The set of solid ink sticks includes a first solid ink stick configured for travel along a first feed channel in a solid ink stick printer in a predetermined orientation, a second solid ink stick configured for travel along a second feed channel in a solid ink stick printer in a predetermined orientation, the configuration of the first solid ink stick being sufficiently different from the configuration of the second solid ink stick that the first solid ink stick cannot travel along the second feed channel, and the first solid ink stick has a verification interlock in at least one surface of the first solid ink stick, and the second solid ink stick has a verification interlock in at least one surface of the second solid ink stick, each verification interlock and the at least one surface in which the verification lock is located engage at least two displaceable members arranged in an insertion area of the solid ink printer to push one displaceable member away from the solid ink stick in the insertion area and to enable the other displaceable member to move towards the solid ink stick in the insertion area when the solid ink stick in the insertion area is in the predetermined orientation.

BRIEF DESCRIPTION OF THE DRAWINGS

Features for verifying position and orientation of a solid ink stick in particular, and of an object to be identified in general are discussed with reference to the drawings.

DETAILED DESCRIPTION

Figure 1:
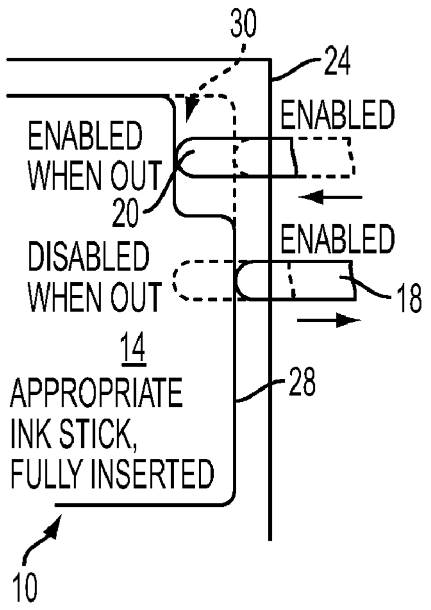
FIG. 1 is a side view of a solid ink stick interacting with a pair of displaceable members to enable movement of the solid ink stick from an insertion port in a solid ink printer.

The term "printer" refers, for example, to reproduction devices in general, such as printers, facsimile machines, copiers, and related multi-function products. An exemplary solid ink printer having an insertion port 10 for the loading of solid ink sticks is shown in FIG. 1. The solid ink printer may have an insertion port for each feed channel or it may have only one common insertion port from which a solid ink stick, once identified, is moved to the corresponding feed channel. An identification code detector (not shown) obtains an identification code from the solid ink stick in the insertion port. This code is compared to data stored in the printer to determine whether the solid ink stick is configured for used in the printer and the feed channel in which the solid ink stick should be used. The identification code detector may be a single device or an array of code activators, such as optical sources, and an array of code detectors, such as optical receivers, that operate to read an identification code on a solid ink stick.

In the port 10, the solid ink stick 14 is inserted from the left, although other port configurations may be used that permit loading of the solid ink stick from any direction other than the wall 24 in which the displaceable members 18 and 20 are located. The solid ink stick 14 includes a side 28 and a feature 30. "Feature" refers to a recess or protuberance in a surface of an object having a predetermined position that enables the orientation of the object to be verified by the displaceable members. In FIG. 1, the feature 30 is a recess into which displaceable member 20 can extend, although features may be used to provide an indication of an object's orientation in the insertion port.

In order to enable the solid ink stick to be moved from the insertion port 10, the displaceable members 18 and 20 must be in a predetermined configuration that corresponds to a predetermined position of one side of the solid ink stick and its feature. As shown in FIG. 1, the displaceable member 20 must extend into the feature 30 and the displaceable member 18 must be depressed by the side 28 in order for movement of the solid ink stick to be enabled. Thus, insertion of the solid ink stick 14 within the port 10 enables the displaceable member 20 to be fully extended and the displaceable member 18 to be retracted within the wall 24. The interaction of the solid ink stick with two displaceable members enables the position and orientation of a solid ink stick to be verified as being correct for identification and movement of the solid ink stick. As described below, the two displaceable members may be independent of one other with each one having a sensor for detecting movement of the member. Alternatively, the two members may be coupled to one another, either through a mechanical link or through common structure in an integrated part.

Identification of an ink stick as being appropriate or inappropriate for use within a printer enables movement of the identified ink stick from the insertion area. This enablement does not necessarily include movement. Identification may be performed using electronic sensors, positioning and displacement of mechanical arms, links, or other actuators, or decoding of data placed on the ink stick. The results of the identification process may be conveyed to a user with an accept/reject signal that may be displayed or used to generate a visible or audible signal at the printer, such as at a control panel, or remotely, at, for example, a pager or remote terminal. Once the identification results are communicated to a user or operator, the printer may wait for a confirmation signal from the user or operator before opening a gate or operating a conveyor to move the ink stick. Thus, communication of the identification results is required for movement of the ink stick, but does not necessarily cause the ink stick to move immediately. Consequently, the term "enabling movement" or the like is intended to encompass such motionless activities or the like.

Figure 2:
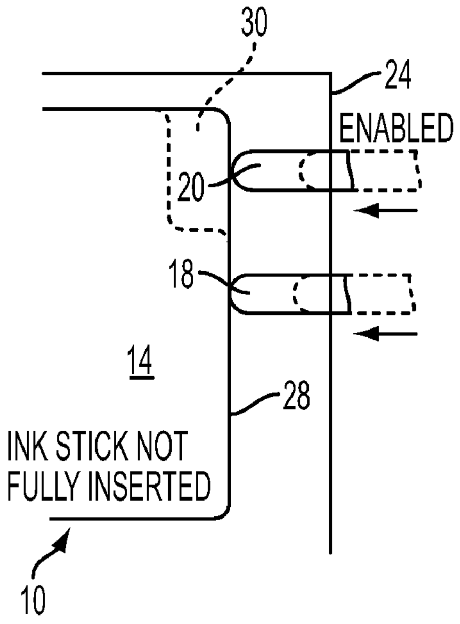
FIG. 2 is a side view of a solid ink stick interacting with a pair of displaceable members to disable movement of the solid ink stick from an insertion port in a solid ink printer.
Figure 3:
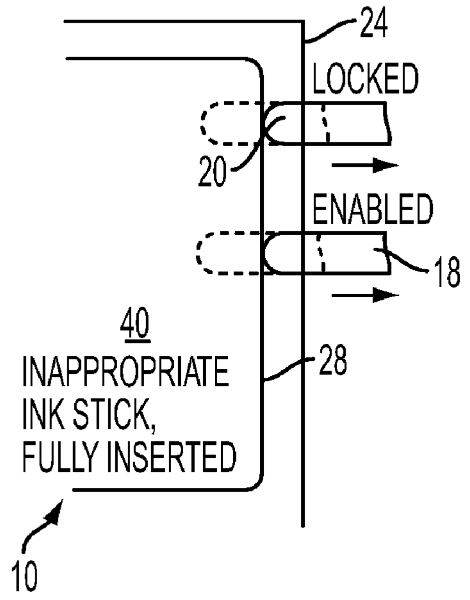
FIG. 3 is a side view of another solid ink stick interacting with a pair of displaceable members to disable movement of the solid ink stick from an insertion port in a solid ink printer.

In FIG. 2 and FIG. 3, two situations are shown that result in the solid ink stick remaining in the insertion port. In FIG. 2, the solid ink stick 14, which can be used in the printer, has been loaded into the port; however, it has not been fully inserted into the port. Consequently, displaceable member 18 has not been sufficiently depressed by the side 28 to enable movement of the solid ink stick. Thus, even if an identification code detector determines the identification code on the solid ink stick corresponds to a code indicating the stick can be used in the printer, the stick will be not moved. This type of operation helps prevent the solid ink stick from becoming jammed if the stick is moved before it is in proper position for movement. For example, if an otherwise proper ink stick is not in the correct position to engage a solid ink transport system coupled to the insertion port, then the displaceable arms prevent attempts to engage the solid ink transport system with the ink stick. In FIG. 3, a solid ink stick 40 is one that is not configured for use in the feed channel or printer coupled to the port 10. This anomaly is detected because the ink stick 40 does not have the feature 30. Consequently, the displaceable member 20 is depressed rather than extended and movement of the stick is not enabled.

Figure 4:
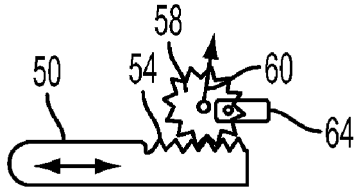
FIG. 4 is a side view of an embodiment of a displaceable member that interacts with an object to be identified.

FIG. 4 illustrates one embodiment of a displaceable member. The displaceable member 50 includes a series of teeth 54 that engages a gear 58 that is biased by a spring 60 or the like to a position that extends the displaceable member from an insertion port wall. A surface that urges the displaceable member 50 against the biasing force causes the displaceable member 50 to move to the right and the teeth 54 rotate the gear 58 in a counterclockwise direction. A sensor 64 generates a signal in response to the movement of the gear. The number of gear teeth moving past the sensor 64 may be counted to evaluate whether the displaceable member 50 has been sufficiently moved to enable movement of the object acting on the displaceable member. After the ink stick or other object is removed, the biasing on the gear 58 returns the displaceable member to its original position.

Figure 5A:
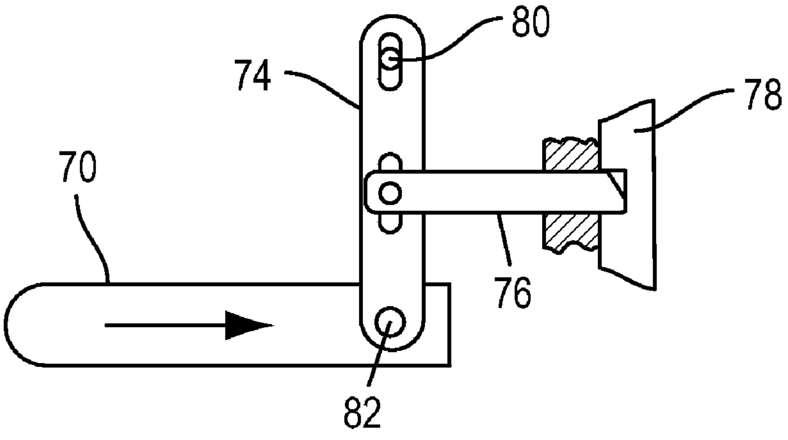
FIG. 5A is a simplified side view of an embodiment of a displaceable member that interacts with an object to block movement of a slide.
Figure 5B:
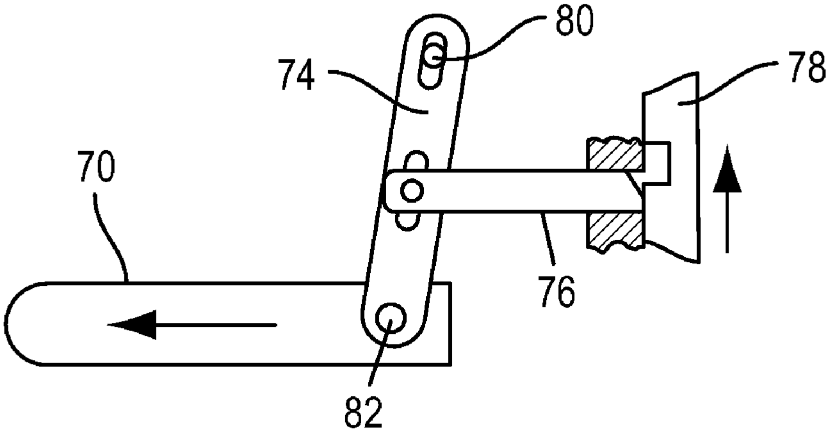
FIG. 5B is a simplified side view of the displaceable member in FIG. 5A in a position to allow movement of the slide.

FIGS. 5A and 5B illustrates another embodiment of a displaceable member. This configuration includes a displaceable member 70, a pivoting link 74, a blocking member 76, and a lockable slide 78. The displaceable member 70 is coupled to the pivoting link 74 at one end of the link by pin 82. A pivot pin 80 is mounted to a rigid structure at the other end of the link 74 so the pivoting link 74 pivots about its pivot pin 80. In response to the displaceable member 70 being moved to the right, the pivoting link 74 pivots about pivot pin 80 to urge the end of the blocking member 76 into engagement with slide 78 to prevent its movement. Upon removal of the ink stick that moved member 70 towards the slide 78, the member 70 moves under the influence of a biasing member (not shown) or gravity, if arranged vertically, to the left. This movement pivots link 74 in the clockwise direction link and disengages blocking member 76 from slide 78. When slide 78 is free to move, its movement may be used to release a movable gate, actuate an ink stick transport, or activate a sensor, for example. Slots 88 and 90 in link 74 enable the movement of the member 74 and blocking member 76 to be coordinated.

In the embodiments shown in FIG. 4 and FIG. 5, each displaceable member may be configured with a sensor that generates a position signal. For example, the sensor 64 may be an optical sensor having an optical source and optical detector that are positioned to enable the gear teeth to pass between them. The gaps between the gear teeth enable the light to pass from the source to the detector, while the gear teeth block the light from the source. The changes in the signal generated by the sensor may be counted to determine the amount of movement of the displaceable member to evaluate whether the ink stick is in the correct position and orientation for identification. In a similar manner, a sensor may be positioned with respect to each sensor associated with a displaceable member of the embodiment shown in FIG. 5 to enable the sensor to generate a signal indicative of the blocking member's movement. The signal from each sensor for each displaceable member may be provided to a signal position generator, which generates a position indicative of the ink stick's position and orientation from the two signals generated by the sensors associated with the two displaceable members. For example, flip-flops, or other logic gates may be used to generate a position signal indicating the ink stick is in position for identification in response to the signals from the sensors indicating the displaceable member interacting with the object feature is in the correct position and the displaceable member interacting with the object side is also in the correct position.

Another embodiment may enable one displaceable member to interact with a sensor to generate a position signal for use within the printer and the other displaceable member may be coupled to a movable gate to enable movement of a solid ink stick from an insertion port selectively. In all of the embodiments discussed herein, the displaceable members may directly block or enable an identification code detector, a movable gate, or transport device. Alternatively or additionally, the displaceable members may generate signals that are used by a controller to operate a gate, an identification code detector, or transport device in a selective manner.

Figure 6:
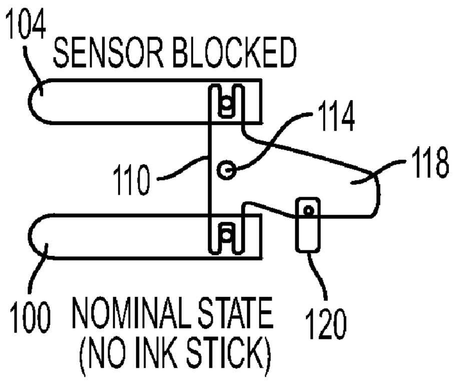
FIG. 6 is a side view of a pair of displaceable members joined by a mechanical linkage in a position that enables a single sensor to generate a signal to enable movement of an object to be identified.
Figure 7:
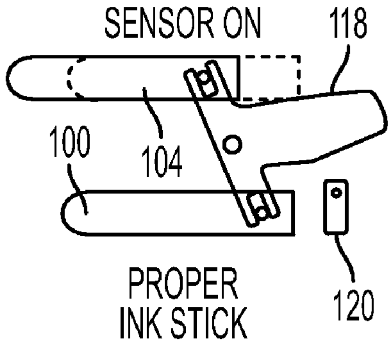
FIG. 7 is a side view of a pair of displaceable members joined by a mechanical linkage in a position that enables a single sensor to generate a signal to disable movement of an object to be identified.
Figure 8:
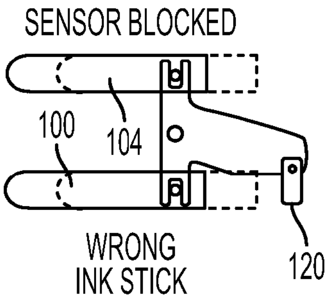
FIG. 8 is a side view of a pair of displaceable members joined by a mechanical linkage that enables a single sensor to generate a signal to disable movement of an object to be identified.

Another embodiment of the displaceable members that enables a single sensor to be used with two displaceable members is shown in FIG. 6, FIG. 7, and FIG. 8. In FIG. 6, the displaceable members 100 and 104 are coupled to one another by a mechanical linkage 110. The linkage pivots about a pivot pin 114. The linkage 110 includes a position flag 118. The position flag moves into and out of a position in which the flag 118 blocks the path between an optical source and an optical detector in an optical sensor 120. In FIG. 6, no object is in an insertion port and the displaceable members 100 and 104 extend to the same length and the flag 118 blocks the light from being received by the optical detector in the sensor 120. In FIG. 7, an ink stick that is configured for use in the insertion port is inserted into the port. When the ink stick has been fully inserted into the port, the displaceable member 100 is moved to the right by the side of the ink stick and the linkage 110 pivots in the counterclockwise direction. This movement extends the displaceable member 104. If the ink stick has the corresponding recess in the corresponding position, the displaceable member 104 extends into the feature and the flag 118 moves into a position in which the flag no longer blocks the light between the optical source and detector in the sensor 120. The sensor then generates a position signal that indicates the ink stick is in position for identification. In FIG. 8, the recess is not in the correct position to receive the displaceable member 104. Consequently, the displaceable members 100 and 104 block further ingress of the ink stick into the insertion port and the sensor 120 generates a position signal that indicates the ink stick is not in position for identification. Although the displaceable members are shown in these figures as being coupled to one another through a mechanical link, the displaceable members may be integrally formed in a single component, such as a plastic injection molded part.

The position signal generated by any of the embodiments may be used in a number of ways to help prevent ink sticks that are either improperly placed in the port or are not configured for use in the port. For example, the position signal may be used to enable the identification code detector. The position signal may be coupled to the identification code detector and, if the signal indicates the ink stick is in the proper position and orientation for identification, the detector is enabled to obtain the identification code from the ink stick. In another embodiment, the insertion port may include a movable gate that blocks egress of the ink stick from the insertion port to the ink stick transport system. This movable gate is operated by a gate actuator, such as an electrical motor coupled to the gate. The position signal may be coupled to the gate actuator to prevent the actuator from operating the gate to enable movement of the ink stick from the insertion port in response to the signal indicating the ink stick is either not configured for use in the port or not in the correct position or orientation for identification. This embodiment enables the printer to respond to the identification code detector only when the ink stick is in the correct position and orientation for identification.

For the two displaceable members to verify position and orientation of an ink stick correctly, the ink stick includes at least two surface features that interact with the displaceable members. While the ink stick may be formed with features specifically incorporated in the ink stick for verification of the position and orientation of the ink stick, the displaceable members may be configured to interact with surface features that exist in current ink stick designs. For example, ink sticks are configured with protrusions and indentations for interactions with feed channel structures. The displaceable members may be arranged in an insertion area to take advantage of accessing the feed channel features for position and orientation verification. Such an arrangement may be most advantageously used in an insertion area for a single channel as an arrangement of displaceable members in a common insertion area for multiple feed channels that accurately interacts with a multitude of different ink configurations may be difficult. In an insertion area that supplies ink stick to multiple feed channels, the ink sticks may be formed with specific verification interlock features.

Figure 9:
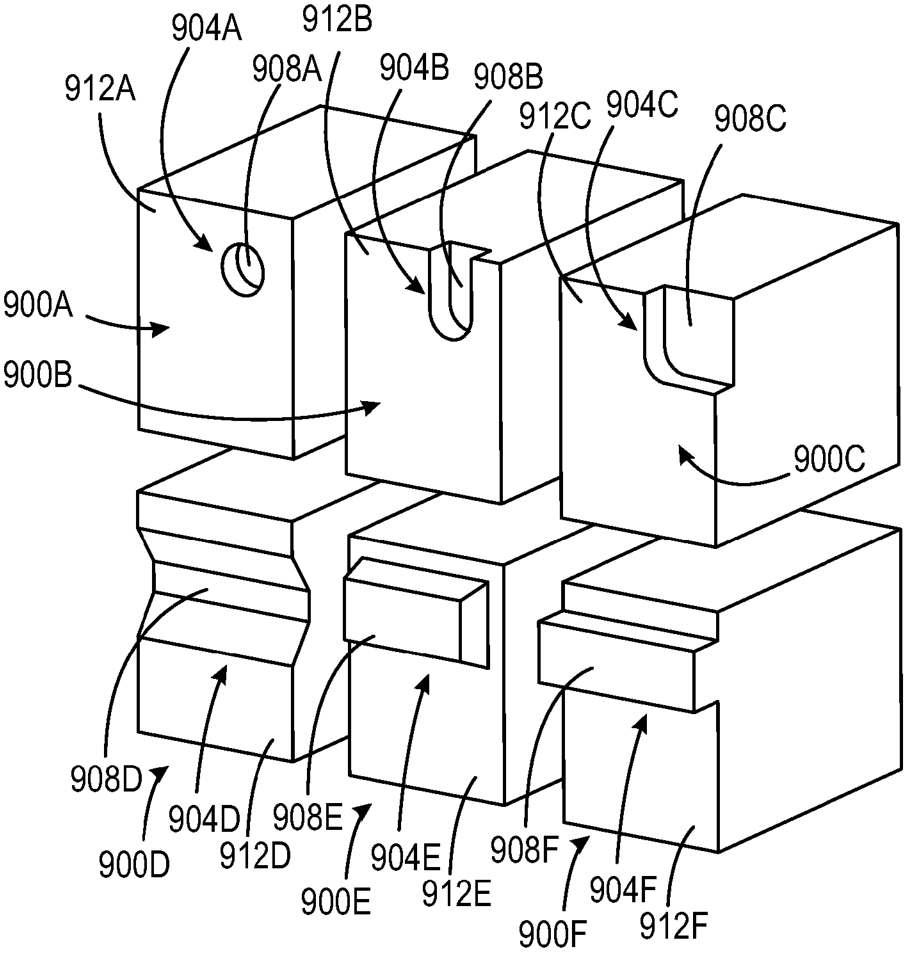
FIG. 9 shows a number of embodiments of ink sticks with verification interlock features that interact with the displaceable members of a verification interlock.

A number of ink stick embodiments depicting various verification interlock features are shown in FIG. 9. These ink sticks take advantage of the push-pull operation of the verification interlock to provide the interlock features on the ink stick surface. Specifically, only one protuberance or one indentation is required in the formation of the ink stick to provide a verification interlock feature. For example, ink sticks 900A, 900B, 900C, and 900D provide a verification interlock feature 904A, 904B, 904C, 904D, respectively, with a single indentation 908A, 908B, 908C, or 908D. These indentations interact with the displaceable member being pulled or extended to verify position and orientation. The planar faces 912A, 912B, 912C, and 912D provide the interaction with the displaceable member being pushed. The indentation 908A is an inset while indentations 908B and 908C are cutouts and indentation 908D is a notch. The inset 908A indents only one planar surface of the ink stick body, the cutout 908B indents two planar surfaces, and the cutout 908C and the notch 908D indent three planar surfaces. In a similar manner, ink sticks 900E and 900F provide a verification interlock feature 904E and 904F, respectively, with a single protuberance 908E or 908F. These protuberances interact with the displaceable member being pushed to verify position and orientation, while planar surfaces 912E and 912F interact with the displaceable member being extended. Protuberance 908E raises one planar surface, while protuberance 908F raises three planar surfaces. Provided that an ink stick verification interlock features do not adversely impact the integrity of other ink stick features, such as feed channel features, then the verification interlocks may be incorporated in a plurality of ink stick configurations to enable a single insertion port to have the displaceable members installed for interaction with the interlock.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A solid ink stick comprising:

a solid ink stick body having a plurality of sides, the sides of the solid ink stick body being configured for insertion into an insertion area in a solid ink stick printer in a predetermined orientation; and a verification interlock positioned in at least one surface of the solid ink stick body at a predetermined location in the at least one surface of the solid ink stick body, the verification interlock and the at least one surface being spatially configured in the solid ink stick body to displace a surface of the verification interlock by a predetermined distance from the at least one surface to enable a first displaceable member that extends into the insertion area to be pushed the predetermined distance away from the solid ink stick body in response to the solid ink stick body being positioned in the insertion area of the solid ink printer with the predetermined orientation and to enable a second displaceable member that extends into the insertion area to move the predetermined distance towards the solid ink stick body positioned in the insertion area with the predetermined orientation in response to the solid ink stick body being inserted into the insertion area with the predetermined orientation and the first displaceable member being pushed away from the solid ink stick body by the predetermined distance.

2. The solid ink stick of claim 1, the verification interlock further comprising:

an indentation positioned at the predetermined location in the at least one surface of the solid ink stick body, the indentation having a surface that is displaced within the solid ink stick body by the predetermined distance from the at least one surface of the solid ink stick body to enable the second displaceable member to move the predetermined distance towards the solid ink stick body in response to the solid ink stick body being inserted into the insertion area in the predetermined orientation and the first displaceable member moving the predetermined distance away from the solid ink stick body.

3. The solid ink stick of claim 2, the indentation indenting the at least one surface of the solid ink stick body.

4. The solid ink stick of claim 2, the indentation indenting at least two surfaces of the solid ink stick body.

5. The solid ink stick of claim 2, the indentation indenting at least three surfaces of the solid ink stick body.

6. The solid ink stick of claim 1, the verification interlock further comprising:

a protuberance positioned at the predetermined location in the at least one surface of the solid ink stick body, the protuberance having a surface that is displaced from the at least one surface of the solid ink stick body by the predetermined distance to enable the surface of the protuberance to push the first displaceable member the predetermined distance away from the solid ink stick body in response to the solid ink stick body being inserted into the insertion area in the predetermined orientation.

7. The solid ink stick of claim 6, the protuberance raising the at least one surface of the solid ink stick body.

8. The solid ink stick of claim 6, the protuberance raising at least two surfaces of the solid ink stick body.

9. The solid ink stick of claim 6, the protuberance raising at least three surfaces of the solid ink stick body.

10. A set of solid ink sticks comprising:

a first solid ink stick having a plurality of sides that are configured for travel along a first feed channel in a solid ink stick printer in a predetermined orientation;

a second solid ink stick having a plurality of sides that are configured for travel along a second feed channel in a solid ink stick printer in a second predetermined orientation, the configuration of the first solid ink stick being sufficiently different from the configuration of the second solid ink stick that the first solid ink stick cannot travel along the second feed channel;

the first solid ink stick having a verification interlock positioned in at least one surface of the first solid ink stick at a predetermined location in the at least one surface of the first solid ink stick, the verification interlock and the at least one surface in the first solid ink stick being spatially configured to displace a surface of the verification interlock in the first solid ink stick by a predetermined distance from the at least one surface in the first solid ink stick to enable a first displaceable member that extends into an insertion area of the solid ink stick printer to be pushed the predetermined distance away from the first solid ink stick positioned in the insertion area with the predetermined orientation and to enable a second displaceable member that extends into the insertion area to move the predetermined distance towards the first solid ink stick positioned in the insertion area with the predetermined orientation in response to the first solid ink stick being inserted into the insertion area with the predetermined orientation and the first displaceable member being pushed the predetermined distance away from the first solid ink stick; and the second solid ink stick having a verification interlock positioned in at least one surface of the second solid ink stick at a predetermined location in the at least one surface of the second solid ink stick, the verification interlock and the at least one surface in the second solid ink stick being spatially configured to displace a surface of the verification interlock in the second solid ink stick by the predetermined distance from the at least one surface in the second solid ink stick to enable the first displaceable member that extends into the insertion area to be pushed the predetermined distance away from the second solid ink stick positioned in the insertion area with the predetermined orientation and to enable the second displaceable member that extends into the insertion area to move the predetermined distance towards the second solid ink stick positioned in the insertion area with the predetermined orientation in response to the second solid ink stick being inserted into the insertion area with the predetermined orientation and the first displaceable member being pushed the predetermined distance away from the second solid ink stick.

11. The set of solid ink sticks of claim 10, the verification interlock in the first solid ink stick further comprising:

an indentation positioned at the predetermined location in the at least one surface of the first solid ink stick, the indentation having a surface that is displaced from the at least one surface of the first solid ink stick by the predetermined distance to enable the second displaceable member to move the predetermined distance towards the first solid ink stick positioned in the insertion area in response to the first solid ink stick being inserted into the insertion area with the predetermined orientation and the first displaceable member being moved the predetermined distance away from the first solid ink stick positioned in the insertion area; and the verification interlock in the second solid ink stick further comprising:

an indentation positioned at the predetermined location in the at least one surface of the second solid ink stick, the indentation having a surface that is displaced from the at least one surface of the second solid ink stick by the predetermined distance to enable the second displaceable member to move the predetermined distance towards the second solid ink stick positioned in the insertion area in response to the second solid ink stick being inserted into the insertion area with the predetermined orientation and the first displaceable member being moved the predetermined distance away from the second solid ink stick positioned in the insertion area.

12. The set of solid ink sticks of claim 11, each indentation indenting the at least one surface of the solid ink stick in which the indentation is located.

13. The set of solid ink sticks of claim 11, the indentation indenting at least two surfaces of the solid ink stick in which the indentation is located.

14. The set of solid ink sticks of claim 11, the indentation indenting at least three surfaces of the solid ink stick in which the indentation is located.

15. The set of solid ink sticks of claim 10, the verification interlock in the first solid ink stick further comprising:

a protuberance positioned at the predetermined location in the at least one surface of the first solid ink stick, the protuberance having a surface that is displaced from the at least one surface of the first solid ink stick by the predetermined distance to enable the first displaceable member to be pushed the predetermined distance away from the first solid ink stick in the insertion area in response to the first solid ink stick being inserted into the insertion area with the predetermined orientation; and the verification interlock in the second solid ink stick further comprising:

a protuberance positioned at the predetermined location in the at least one surface of the second solid ink stick, the protuberance having a surface that is displaced from the at least one surface of the second solid ink stick by the predetermined distance to enable the first displaceable member to be pushed the predetermined distance away from the second solid ink stick positioned in the insertion area with the predetermined orientation in response to the second solid ink stick being inserted into the insertion area with the predetermined orientation.

16. The set of solid ink sticks of claim 15, the protuberance raising the at least one surface of the solid ink stick in which the verification interlock is located.

17. The set of solid ink sticks of claim 15, the protuberance raising at least two surfaces of the solid ink stick body.

18. The set of solid ink sticks of claim 15, the protuberance raising at least three surfaces of the solid ink stick body.

* * * * *